United States Patent [19]

Gerlach et al.

[11] 4,169,827
[45] Oct. 2, 1979

[54] FLAME RESISTANT AND SELF-EXTINGUISHING POLYMER COMPOSITIONS

[75] Inventors: Klaus Gerlach, Obernau; Wolfgang Lange, Obernburg, both of Fed. Rep. of Germany

[73] Assignee: Akzona Incorporated, Asheville, N.C.

[21] Appl. No.: 774,073

[22] Filed: Mar. 3, 1977

Related U.S. Application Data

[63] Continuation-in-part of Ser. No. 743,242, Nov. 19, 1976, abandoned.

[30] Foreign Application Priority Data

Nov. 25, 1975 [DE] Fed. Rep. of Germany ....... 2628902
Jun. 28, 1976 [DE] Fed. Rep. of Germany ....... 2628964
Jun. 28, 1976 [DE] Fed. Rep. of Germany ....... 2552511

[51] Int. Cl.$^2$ ............................................. C08K 5/09
[52] U.S. Cl. ...................... 260/45.75 R; 260/45.75 P; 260/45.75 M; 260/45.75 W; 260/45.75 T; 260/45.75 B; 260/45.85 T; 260/45.75 C
[58] Field of Search .................. 260/45.75 R, 45.75 P, 260/45.75 M, 45.75 W, 45.75 T, 45.75 B, 45.85 T, 78 S, 75 R, 40 R, 45.75 C, 45.75, 42.43, 42.49, 42.46, 37 EP, 37 N; 526/4; 252/8.1

[56] References Cited

U.S. PATENT DOCUMENTS 3,163,492  12/1964  Thomas ........................ 260/45.75 M
3,318,856  5/1967  Deyrup et al. ................ 260/45.75 F
3,872,052  3/1975  Fielding et al. .................. 260/42.46
3,878,166  5/1975  Woycheshin et al. ............ 260/42.46

FOREIGN PATENT DOCUMENTS 1941189  3/1971  Fed. Rep. of Germany .
2212718  9/1975  Fed. Rep. of Germany .
2152196 12/1975  Fed. Rep. of Germany .
1195098  6/1970  United Kingdom ........................ 526/4

OTHER PUBLICATIONS

Chemical Reviews, vol. 61 (1961) pp. 213 to 246.

Primary Examiner—Veronica P. Hoke
Attorney, Agent, or Firm—Francis W. Young; Jack H. Hall

[57] ABSTRACT

Flame retardant, and under some conditions self-extinguishing synthetic polymers are made by the addition thereto of a complex salt of an alkali aluminum acid of the formula:

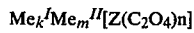

$$Me_k^I Me_m^{II}[Z(C_2O_4)n]$$

wherein Me represents Li, Na, K, Rb, Cs or NH$_4$, Me$^{II}$ represents one of the aforementioned cations or Ba; Z represents one of the central atoms Mg, Ba, Zr, Fe, Co, Cu, Zn, Al, Sn, Cr and Sb and k≈0,1,2,3, or 4, m≈0 or 1 and n≈2,3 or 4, where the value of k, n and m may be other than integers provided that k and m are not, simultaneously, zero.

16 Claims, No Drawings

FLAME RESISTANT AND SELF-EXTINGUISHING POLYMER COMPOSITIONS

This application is a continuation-in-part of application Ser. No. 743,242, filed Nov. 19, 1976, now abandoned.

This invention relates to flame resistant and self-extinguishing synthetic polymers suitable for the production of fibers, films, sheets, injection molded articles and other molded elements as well as for the production of lacquers and coatings and to a process for the manufacture of flame resistant and self-extinguishing polymers.

Many processes have been proposed for the manufacture of flame-resistant textiles and polymer molding compounds. Many of these processes are described in Hans Vogel "Flammfestmachen von Kunstoffen"; Dr. Alfred Huethig Verlag, Heidelberg, 1966; John W. Lyons, "The Chemistry and Uses of Fire Retardants", Wiley-Interscience, New York-London-Toronto, 1970; Allec Williams, "Flame Resistant Fabrics", Noyes Data Corporation, Park Ridge, New Jersey, London, 1974. Reference is also made to the special edition, "Flammhemmende Textilien" of the Journal "Textilveredlung", Vol. 10, May 5, 1975.

The heretofore commercially available flame-retardant materials contain mainly the elements phosphorous, halogen and nitrogen. In many cases, to enhance the flame retardant effect, antimony, for example, in the form of $Sb_2O_3$, is added to the flame retardant, so that as a rule, flame-proofed polymers contain a relatively high percentage of additives. The introduction of flame retardants of this quality and in this quantity into polymers, is attended by a number of detrimental effects.

For example, when added in effective amounts, these flame retardants result in most cases in undesirable, negative effects on the physical properties and serviceability of the polyesters. In general, they bring about a substantial downgrading of breaking strength, elongation, initial modulus, elasticity, as well as impairment of the color. Moreover, especially in filaments, in spite of the relatively high amount of flame retardant in the polymer, the flame retardant effect is often inadequate, so that only a few of the synthetic polymers given a flame retardant effect of this type are self-extinguishing.

In addition, flame retardants known in the art, are in many cases injurious to the skin and often represent toxic substances. Thus, a number of bromine-containing compounds produce skin irritations. Furthermore, many phosphorous compounds, especially halogenated sulfuric esters, are highly toxic.

Moreover, the flame retardants known in the art, which decompose on combustion, generate toxic, and to some extent corrosive gases, such as hydrohalogen acids, elementary halogen-oxygen compounds, nitric oxide, hydronitrogen compounds and, under certain conditions, hydrogen cyanide and dicyanide. In addition, a series of known flame retardants for synthetic polymers lead, during combustion, to accelerated degradation of the polymer melt. This results in increased dripping of the partly, still flaming polymer melt.

The use of flame retardants incorporated in commercial filaments and fibers usually produce only a temporary flame retardant effect, since the retardants are removed by repeated washings or dry cleaning. Commercial flame retardants, especially products containing bromine, have the additional disadvantage of being relatively expensive. Moreover, for many of these flame retardants to be built into the polymer or for finishing, special techniques must be developed, e.g., specific metering via mixers or metering pumps is required and the chemically corrosive bromine compounds frequently cause corrosion problems.

It is an object of this invention to provide a method for making synthetic polymers flame retardant with a material which is devoid of the foregoing disadvantages. Another object of the invention is to provide polymeric shaped articles such as filaments, films, sheets, molded products and the like having improved flame retardancy and self-extinguishing characteristics.

It has surprisingly been found that complex compounds of oxalic acid as opposed to the simple salts of oxalic acid are excellent flame retardants for polyesters, polyamides, polyolefins, polyacrylates, and epoxy resins. The use of oxalato complexes has up to now only been mentioned in isolated cases, and that exclusively in connection with the flameproofing of natural and synthetic polyamides by aftertreatment with solutions of flame retardants.

According to a process described in German Patent Disclosure No. 1,941,189 dealing with the flameproofing of polyamide molding compounds containing fillers or of block graft polymers, use is made as flame retardants of mixtures of highly brominated polyethers and antimony trioxide or antimonyl compounds. As example of an antimonyl compound, complex antimony oxalates, like $NaSb(C_2O_4)_2$ are cited in addition to antimony (III) hydroxide, sodium antimonite, antimonyl chloride and antimony potassium tartrate. The oxalato complex represents here only one of the potential antimony carriers. an autonomous flame retardant effect of oxalic acid complexes is not mentioned in this patent disclosure.

In German Patent Disclosure No. 2,152,196 mention is made of a process to improve the flame resistance of natural and synthetic polyamide fibers by means of titanium complex compounds, whereby the complex is formed with an organic chelate-forming agent or with fluorine ions. But here as well the oxalato complex is merely mentioned as one of the potential heavy metal carriers, citric acid complexes and tartaric acid complexes are, however, preferred. As a rule, the flame retardant is applied from an aqueous solution to the textile material to be finished. The process is especially meant for wool and blends of wool and synthetic fibers, whereby the flame retardant is also adsorbed from a treatment liquid. Hence, it is not surprising that the process fails in flameproofing of 100% synthetic fibers, especially in the case of hydrophobic polyamides. In the case of blends of wool and synthetic fibers, only the wool constituent is, of course, flameproofed. Consequently, the use of oxalato complexes as flameproofing agent for polyamides, polyolefins, polyacrylates and epoxy resins could also not be suggested in this patent disclosure.

The same is true for the process described in German Patent Application No. 2,212,718 in which natural and synthetic polyamide fibers are treated by means of anionic complexes of zirconium with an organic chelate-builder or fluoride ions in aqueous solutions within a pH range of 0.5 to 4. Here, too, in addition to purely inorganic compounds, mention is made of the oxalato complex as one of the potential carriers for zirconium; yet in this case the process also fails on 100% synthetic fibers.

A further object of the present invention is a process for the preparation of permanently flame-resistant and under certain conditions, self-extinguishing, molding masses of polyesters, polyamides, polyolefins, polyacrylates, and epoxy resins, characterized in that one or more oxalato complexes are introduced as flame-retardant additive in the molding compound.

Oxalato complexes to be considered here are especially those containing a complex anion of the type $[Z(C_2O_4)_n]^{-e}$, whereby Z represents one or more central atoms, n the number of ligands and $-e$ the negative charge of the complex anion. Oxalato complexes of this type are described in detail by K. V. Krishnamurty and G. M. Harris in Chemical Reviews, Vol. 61, (1961), pages 213 to 246. As a rule, the ligands number 1, 2, 3 or 4, the charge of the complex anion is $-1$, $-2$, $-3$, $-4$ or $-5$, and the number of central atoms 1, whereby the number of ligands and the charge of the complex anions is determined by the coordination number and the charge of the central atoms. Oxalato complexes with complex anions of the type $[Z(C_2O_4)_n]^{-e}$ refer, according to the invention, not only to those compounds, whose composition is exactly stoichiometric, but also to compounds whereby n and $-e$ have values which deviate upwards or downwards from integers. This is the case, for example, when a small portion of the oxalato ligands is substituted by other ligands. Such compounds may be formed during or after the synthesis of oxalato complexes, in that extraneous ligands are built into or substituted in the complex anion. The same is similarly true of the central atom, i.e., the scope of the present invention includes also such oxalato complexes, whose cationic constituent is not strictly stoichiometric. Thus, here too, the value of the central atom may not be an integer. This will be so when part of the central atom is substituted by another central atom with a different coordination number or another valency. It is known that such deviations from a precise stoichiometry are frequently encountered in complex chemistry and are familiar to those skilled in the art.

Included among the oxalato complexes to be used according to the invention are heterogeneous oxalato complexes which instead of the stoichiometric quantity of a central atom, contain the corresponding amount of different central atoms. Mixtures of various homogeneous or heterogeneous oxalato complexes can, of course, also be considered.

As central atoms of oxalato complexes, especially in the case of the preferred compounds with a complex anion of the type $[Z(C_2O_4)_n]^{-e}$ such metals as Mg, Ca, Sr, Ba, Zr, Hf, Ce, V, Cr, Mn, Fe, Co, Ni, Cu, Zn, Cd, B, Al, Ga, In, Sn, Pb, and Sb may be considered. The cationic constituent of the oxalato complex contains preferably at least one of the ions Li, Na, K, Rb, Cs or NH$_4$, or one of the mentioned ions and Ba.

Use is preferably made of oxalato complexes of the general formula:

$$Me_k^I Me_m^{II} [Z(C_2O_4)_n] \quad (1)$$

wherein Me$^I$ represents Li, Na, K, Rb, Cs, or NH$_4$, Me$^{II}$ one of the above-mentioned cations or Ba, Z one of the central atoms Mg, Ba, Zr, Fe, Co, Cu, Zn, Al, Sn, Cr and Sb and $k \approx 0$, 1, 2 or 3, $m \approx 0$ or 1 and $n \approx 2$, 3, or 4. However, k and m may not, simultaneously, be zero. (The sign $\approx$ has been selected to make it clear here again that the values for k, m and n may deviate from integers; cf., Example 1-14). Preferred above all are alkali-aluminum-oxalato complexes of the general formula:

and the oxalate complexes $K_4[Zn(C_2O_4)_3]$, $K_4[Zr(C_2O_4)_4]$, $K_3[Cr(C_2O_4)_3]$, $K_3[Fe(C_2O_4)_3]$, $K_3[Sb(C_2O_4)_3]$, $KBa[Fe(C_2O_4)_3]$, $KBa[Al(C_2O_4)_3]$, $K_2[Mg(C_2O_4)_2]$, $K_2[Fe(C_2O_4)_2]$, $K_2[Zn(C_2O_4)_2]$, $K_2[Cu(C_2O_4)_2]$, $Ba[Mg(C_2O_4)_2]$ The above oxalato complexes proved to be a new category of compounds that are eminently suitable flame retardants for polyesters, polyamides, polyolefins, polyacrylates and epoxy resins. As a rule, cesium complexes are most effective, followed by rubidium, potassium, and sodium complexes, and finally the lithium complexes being comparatively the least efficient. A very good flame retardant effect is also exhibited by mixtures of alkali/barium complexes and by the barium/magnesium complex.

Compounds of the above-mentioned formula (1) wherein $m=0$ and $Z=Al$ are complex lithium, sodium, potassium, rubidium, cesium, ammonium-aluminum-dioxalato or aluminum trioxalato salts, coordinated with a tetravalent or hexavalent aluminum atom. These compounds are known and are readily obtained by precipitation of their components from aqueous solutions, for example, by reaction of an aluminum sulfate solution with a lithium, sodium, potassium, rubidium, cesium or ammonium oxalate solution. The preparation and characteristics of these complex salts are described in "Gmelins Handbuch der Anorganischen Chemie", Vol. 8, "Aluminum", Part B 1, Chemie GmbH Weinheim/Bergstr. 1933. Another useful process for the preparation of potassium-aluminum trioxalate salt, whereby freshly precipitated aluminum hydroxide is treated with an aqueous solution of potassium hydrogen oxalate, is described in Inorganic Synthese, Vol. L, McGraw-Hill Book Company, Inc., New York and London, 1935, page 36. Among oxalato complexes with other central atoms, most of the compounds to be used according to the invention are also known and adequately described. They can be obtained by reaction of a salt of the central atom with alkali oxalate. Suitable compounds of the central atom are sulfates, chlorides, hydroxides, acetates, carbonates and oxalates. For additional details on the preparation of these complexes, reference is made to the following literature excerpts:

D. P. Graddon, J. Inorg. & Nucl. Chem. 1956, Vol. 3, pp. 308–322

D. P. Graddon, Inorg. Syntheses, Vol. I, p. 36

K. V. Krishnamurty et al., Chem. Rev. 61 (1961) pp. 213–246.

Oxalato complexes, whose preparation is not explicitly described, can be similarly prepared (see also the following examples). It is, of course, also true here that the number of alkali atoms or alkaline earth atoms, i.e., the magnitude of k and l, as well as the magnitude of m is determined by the valency of the central atom, and that the invention also embodies the use of such compounds whose compositions is not precisely stoichiometric according to the letter of the above formula (1), i.e., meaning also such compounds, whereby the value for k, l and m deviates upward or downward from integers. The flame retardants according to the invention are especially suitable for polyesters and polyamides.

The term polyester refers both to homo- and copolyesters. Examples of such polyesters are those which can be obtained using one or more of the following cited acids or their ester-forming derivatives and one or more bivalent or polyvalent aliphatic, alicyclic, aromatic or araliphatic alcohols or a bisphenol: adipic acid, pimelic acid, suberic acid, azelaic acid, sebacic acid, nonanedicarboxylic acid, decanedicarboxylic acid, undecanedicarboxylic acid, terephthalic acid, isophthalic acid, alkyl-substituted or halogenated terephthalic and isophthalic acids, nitroterephthalic acid, 4,4'-diphenylether dicarboxylic acid, 4,4'-diphenylthioether dicarboxylic acid, 4,4'-diphenylsulfone dicarboxylic acid, 4,4'-diphenylalkylene dicarboxylic acid, naphthalene-2,6-dicarboxylic acid, cyclohexane-1,4-dicarboxylic acid and cyclohexane-1,3-dicarboxylic acid.

Typical diols or phenols that can be used for the preparation of the homo- and copolyesters are: ethylene glycol, diethylene glycol, 1,3-propanediol, 1,4-butanediol, 1,6-hexanediol, 1,8-octanediol, 1.10-decanediol, 1,2-propanediol, 2,2-dimethyl-1,3-propanediol, 2,2,4-trimethyl hexanediol, p-xylenediol, 1,4-cyclohexanediol, 1,4-cyclohexane dimethanol and bisphenol A. Furthermore, the term polyester refers also to conventional resins based on unsaturated esters and conventional products reinforced with, e.g., fiberglass, asbestos, carbon and graphite fibers. The oxalato complexes are used preferably in conjunction with polyethylene terephthalate, polypropylene terephthalate and polybutylene terephthalate.

Examples of polyamides are those on a basis of butyrolactone (nylon 4), 6-amino-caproic acid of caprolactam (nylon 6), 7-amino-enanthic acid (nylon 7), 11-aminoundecanoic acid (nylon 11), 2-laurin lactam (nylon 12); furthermore, those based on dibasic carboxylic acids and diamines, e.g., polyhexamethylene adipamide (nylon 66) and polyhexamethylene sebacinamide (nylon 610), as well as aromatic polyamides, e.g., poly-p-benzamide, poly-m-benzamide, etc.

Furthermore, the oxalato complexes are eminently suitable as flame retardants for polyacrylates such as polyacrylonitrile, polymethacrylic ester and polyacrylic ester and for polyolefins such as polyethylene, polypropylene, polybutylene, poly-isobutylene, polystyrene, polyvinyl alcohol, polyvinyl chloride, polyvinylidene chloride, polyvinyl acetate and polyvinyl ether, and for epoxy resins. The above designations are to be understood in the broadest sense, thus including, e.g., modified polymers, copolymers and copolycondensates.

The flame retardants according to the invention are suitable for all conventional molding compounds of the cited polymers. They can be used in the form of granules, chips or spaghetti; as molded elements such as sheets, films, or fibers or as textile end products such as e.g., yarns, knits, nonwovens, cloth and carpets.

Little is known of the mechanism and working principle of the oxalato complexes to be used as flame retardant according to the invention. It must be assumed, however, that these compounds intervene in not only one phase of the combustion process, e.g., in that halogenated flame retardants postpone combustion by intervention in the radical chain; but rather that the flame retardant effect of the invention is the result of several individual flame-inhibiting processes at different stages of the combustion process. The flame retardants according to the invention are included in the group of inert-gas-releasing substances. Their advantage resides in the fact that for each mole of initial substance they release up to 4 moles of carbon dioxide. Their efficiency is presumably based on the following principles: withdrawal of thermal energy from the melt by dissociation of the flame retardant and heating of the inert gas; displacement and dilution of the oxygen at the surface of the burning polymer melt due to the release of $CO_2$, formation of oxide and salt coatings during the combustion process as well as accelerated transport of radical interceptors, such as for example alkali atoms in the gas phase.

It is clear that between the decomposition temperature and the efficiency of the flame retardant according to the invention on the one hand, and the polymer to be treated with a flame resistant on the other hand, there is a certain correlation which must be taken into account when selecting oxalato complexes. For instance, one essential prerequisite for the efficiency of the oxalato complexes is that their decomposition temperature be lower than the melt temperature of the burning polymer. On the other hand, the oxalato complexes should remain inert chemically up to the temperature at which molding takes place. Hence, oxalato complexes suitable for polyhexamethylene adipamide should have a decomposition temperature higher than the processing temperature of which is about 280° C., but on the other hand it should not exceed the temperature of burning polyhexamethylene adipamide, which is about 490° C. The decomposition temperatures of oxalato complexes, to the extent that they are not mentioned in the literature, are easily determined by thermogravimetric analysis (TGA). As regards TGA procedures, reference is made to Ullmanns Encyklopadie der technischen Chemie, 3rd Edition (1961), Urban & Schwarzenberg Publishers, Munich-Berlin, Vol. 2/1, Pate 657. Some examples of the decomposition temperatures of different oxalato complexes are listed in the following table.

| OXALATO COMPLEX | | DECOMPOSITION TEMPERATURE (°C.) |
|---|---|---|
| $Rb_3$ | $[Al(C_2O_4)_3]$ | 430 |
| $K_3$ | $[Al(C_2O_4)_3]$ | 430 |
| $K_3$ | $[Fe(C_2O_4)_3]$ | 440 |
| $K_3$ | $[Cr(C_2O_4)_3]$ | 450 |
| $K_4$ | $[Zr(C_2O_4)_4]$ | 395 |
| $K_2$ | $[Mg(C_2O_4)_2]$ | 470 |
| KBa | $[Al(C_2O_4)_3]$ | 425 |

The melt temperature of the burning polymer, i.e., the temperature in the melt of the polymer burning in the presence of air can be determined, for example, by means of a thermoelement. For this determination, it is expedient for the solder joint of the thermal element to be kept constantly covered with dripping melt during the measurement.

A very advantageous process to determine the decomposition temperatures is the differential thermoanalysis (DTA), since the location of the main endothermic effect in the DTA diagrams of the oxalato complexes indicates the decomposition temperature. As regards the differential thermoanalysis reference is made to relevant textbooks and handbooks, for example, Ullmanns Encyclopedia of Technical Chemistry, 1.C. pages 656–657, as well as Franke, Lexikon der Physik, Franckh'sche Verlagshandlung Stuttgart, 3rd Edition.

It is thus expedient when selecting suitable oxalato complexes as flame retardants for polyester to provide for optimum consistency between the decomposition temperature of the oxalato complex and the melt temperature of the burning polymer. The expert, who is faced with the task of flameproofing a very special polymer, who does not know the DTA values, and who moreover does not have the equipment to measure the melt temperature of the burning polymer, nor the necessary instruments for a differential thermal analysis, may, by means of a few exploratory experiments quickly obtain reliable information on those oxalato complexes that can be used and will provide optimum flame protection. This applies, of course, also in such cases where for any unforseeable reason, in spite of a suitable level of the decomposition temperature of the oxalato complex and of the melt temperature of the polymer, no satisfactory flame protection can be obtained.

All complex salts of the invention are excellent flame retardants. The two potassium complex salts $K_3[Al(C_2O_4)_3]$ and $K_2[Mg(C_2O_4)_2]$ as well as the rubidium complex salts $Rb_3[Al(C_2O_4)_3]$ are especially effective in polyethylene terephthalate. Compared with other complex salts, they are distinguished by the fact that not only do they confer flame resistance to the polyester compounds but self-extinguishing characteristics beyond that. Dripping of the melt during combustion is largely inhibited. Among the mentioned complex salts, $K_3[Al(C_2O_4)_3]$ is preferred. Especially effective for polyamides are the oxalato complexes $K_2[Mg(C_2O_4)_2]$ $Rb_3[Al(C_2O_4)_3]$ and $KBa[Fe(C_2O_4)_3]$. Compared to other complex salts, the latter two compounds are especially distinguished in that they largely inhibit dripping of the melt.

A relatively small amount of the oxalic acid complex salts of the invention has a substantial flame retardant effect. They are preferably applied in quantities of 1 to 40 weight %, especially 5 to 15 weight %, based on the flame resistant and under certain conditions self-extinguishing polymers. The complex salts are preferably used in anhydrous form.

According to the invention, a permanently flame resistant and under certain conditions self-extinguishing polymer molding compound is obtained in that one or more of the oxalic acid complex salts of the invention are incorporated in a conventional manner in the polymer compound. Among processes, consideration is given to those whereby the flame retardant is added to the monomer during poly-addition, polymerization or polycondensation and homogeneously dispersed in this manner in the forming polymer. Another possibility of incorporation consists in melting the polymer mass, blending it with the flame retardant and subsequently processing it into chips or molding it directly. Another possibility consists in dusting the finely divided flame retardant on the polymer chips and thus process it jointly. The process to be used is governed by the end uses of the flame retardant and/or self-extinguishing molding compound and can be selected without difficulty by those skilled in the art.

In the case of molded articles of larger dimensions or having thick walls, the distribution of the flame retardant presents relatively few problems and it is not difficult to make up the flame retardant in any suitable grain size to meet any purpose. On the other hand, in preparing flame retardant and/or self-extinguishing fibers according to the process of the invention, the aim is to use the flame retardant in a very finely distributed form to permit spinning of the polymer and insure end products exhibiting good physical properties. The appropriate particle size is here too governed by end use and easily determined by those skilled in the art. For example, in the case of fibers, it is determined by the denier of the fiber and the desired physical characteristics of the end product. For textile fibers, the complex salts may be used in particle sizes to about 2 microns.

The complex salts to be used according to the invention can be divided without difficulty. For instance, they can easily be ground, whereby any adhering and crystal water have to be removed. Drying of the complex salt is also easy. It can be accomplished, for example, over several hours at 150° C. and 10 mm Hg. The complex salts can be ground dry as well as wet. For wet grinding, the selection of suitable dispersing liquids will also be guided by the end use and the manner of application of the flame retardant.

According to a preferred version of the invention, the molding compound is a homopolyester or a copolyester of terephthalic acid and the oxalic acid complex salt is one or more of the complex salts $K_3[Al(C_2O_4)_3,]$ $K_2[Mg(C_2O_4)_2]$ and $Rb_3[Al(C_2O_4)_3]$, whereby the oxalic acid complex salt or salts are already added to the polycondensation monomers. In this case, the complex salts are ground in the polyvalent alcohol or alcohols used to make up the polyester, e.g., in ethylene glycol for polyethylene terephthalate. The resulting suspension of the complex salt is preferably added directly to the polycondensation mix.

The process of the invention is preferably used for the production of self-extinguishing homo- and copolyester fibers, especially polyethylene terephthalate fibers, whereby preferably $K_3[Al(C_2O_4)_3]$ is used as oxalic acid complex salt and the amount of same is 5 to 15 weight %, based on the self-extinguishing molding compound.

In reinforcing polymers by means of fiberglass one should take into consideration that in the case of glass types containing alkaline earth, especially those containing calcium, the flame retardant effect of the flame retardant according to the invention will be somewhat impaired. It is assumed that this impairment of the efficiency is due to the presence of alkaline earth, e.g., calcium, added to the polymer via the fiberglass. Presumably, the calcium in the oxide form reacts under melting conditions with the oxalato complex, forming calcium oxalate and a complex minus one oxalato ligand. This reaction possibly results thus in successive degradation of the flame retardant in the melt, so that said flame retardant has only a very limited efficiency. It has been observed that additives that are under these specific conditions to intercept alkaline earth, especially calcium by formation of stable calcium compounds, do inhibit impairment of the flame proofing effect. Suitable additives are primarily compounds such as $MgCO_3$, $MgSO_4$, $K_2C_2O_4$, $K_2CO_3$, $Al_2(SO_4)_3$ and $K_2SO_4$. The additive is added in amounts of 1 to 10 weight %, preferably 5 to 10 weight %, based on the total weight of polymer, fiberglass, flame retardant and additive. But, when using said fiberglass even without the above described additives, the flame resistant effect is still remarkable and adequate for many end uses.

The above-mentioned additives can, of course, also be useed in the case of other alkaline earth-containing reinforcing fillers, as well as in the presence of different alkaline earth-containing additives. All of the polymers of the invention are flame retardant and under certain conditions, self-extinguishing, molding compounds and can be obtained by the above process, in conjunction with the cited oxalato complexes, especially those containing the oxalato complex in amounts of 1 to 40 weight %, preferably 5 to 15 weight %.

The complex salts to be used according to the invention exhibit a number of distinct advantages over known flame retardants. It should be pointed out first of all that they are very readily accessible from the raw materials oxalic acid, an inorganic metal salt or metal hydroxide and, under certain conditions, a simple inorganic alkali salt, whereby the preparation is carried out in aqueous solution. With the exception of the cesium and rubidium complex salt, they are substantially cheaper than conventional products containing halogen, phosphorus, nitrogen and/or $Sb_2O_3$.

Since, compared with flame retardants known in the art, the efficiency of the complex salts of the invention is greater, addition of only a few weight percent to the polymer will provide a comparable flame retardant effect. Consequently, the characteristic properties of the treated material are only slightly modified.

The compounds of the invention are quite compatible with the skin. Nor do they generate additional toxic gases on combustion. $CO_2$ is the only gaseous combustion product formed by the substances. Dripping of the polymer melt is largely inhibited by incorporation of the complex salts of the invention.

Based on the LOI, there is no perceptible reduction in the flame retardant effect provided by the compound of the invention even after repeated washing and dry cleaning of textiles. Although soluble in water, removal of said compounds from textiles by washing is surprisingly low and the flame retardancy of the textiles is fully preserved even after more than 20 washing cycles. The LOI in the following examples was determined according to ASTM-D 2863 using a measuring instrument of Stanton Redcroft, G.B.

The LOI (Limiting Oxygen Index) is defined as the oxygen content (in %) of an oxygen-nitrogen mixture in which a vertically clamped specimen, ignited at the top, will just barely burn. The $\Delta$ LOI corresponds to the difference between the measured LOI of a flame-proofed specimen and the LOI of a non-flame-proofed specimen.

EXAMPLE 1

Preparation of self-extinguishing polyethylene terephthalate fibers.

a. Preparation and pulverization of the flame retardant $K_3[Al(C_2O_4)_3]$ was prepared as described by J. C. Bailar and E. M. Jones in Inorganic Synthesis 1 (1939), page 36. The resulting complex salt was subsequently dried for 15 hours at 150° C. and about 10 Torr. Analysis of the samples which were obtained in different batches, yielded: $K_{2.87}[Al(C_2O_4)_{3.02}]$ and $K_{3.36}[Al(C_2O_4)_{3.46}]$. 200 g. of the dried complex salt was ground for about 2 hours with 400 g. ethylene glycol in a Perl-mill (PMl. manufactured by Draisverke, Mannheim) using 410 g. quartz beads of a diameter of 1 to 3 mm. After pulverization, the diameter of the largest complex salt particle in the dispersion was about 4 microns, whereas most of the particles had a size of one micron. The quartz beads were then separated by filtration over a screen, rinsed with 200 ml. ethylene glycol and the dispersion diluted with the rinsing solution. By allowing the dispersion to stand in tall vessels for 72 hours all particles bigger than 2 microns were largely separated (sedimentation).

b. Polycondensation 600 grams of this dilute dispersion containing 150 grams $K_3[Al(C_2O_4)_3]$ was introduced together with the ester interchange product of 1350 g. dimethyl terephthalate and 1200 g. ethylene glycol, at a stirrer speed of 30 rpm and a temperature of about 245° C., into the polycondensation vessel. 150 ppm zinc acetate was used as transesterification catalyst, 200 ppm antimony trioxide as condensation catalyst.

The polycondensation, which normally requires about 85 min., was completed after one hour. The distilled ethylene glycol was reusable for new condensations without purification. The polycondensate contained 10 weight % $K_3[Al(C_2O_4)_3]$.

c. Molding

The resulting polycondensate was conventionally made into chips, which were dried for 24 hours at 125° C. and 60 Torr. The chips were spun at 296° C. (spinning head temperature) to filament yarn of 3.0 dtex individual filament denier, and a total denier of 150 dtex 48. The filament yarn was consecutively drawn to a ratio of 1:4.2 and twisted. In terms of light stability, light fastness and solution viscosity, the textile data of the resulting material correspond largely to those of conventional polyethylene terephthalate, obtained under above-mentioned conditions without the addition of a flame retardant.

d. Determination of the Burning Behavior

The above described filament yarns were knitted to a 4-filament knit and the burning behavior was tested according to the vertical burning test (DIN 53906). A corresponding specimen without flame retardant, and a specimen with the same amount of commercial bromine-containing flame retardant 2,2-bis-(4-ethoxy)-3,5-dibromophenylene propane, were used as controls.

The following results were obtained

| Exposure to flame (sec.) | | Specimen Without Flame Retardant | Specimen With 10 Wt. % Commercial Bromine-Containing Flame Retardant | Specimen With 10 Wt. % $K_3[Al(C_2O_3)_3]$ |
| --- | --- | --- | --- | --- |
| Exposure to flame (sec.) | burned completely | 3 | 3 | 3 |
| Combustion time (sec.) | | | 88 | 0 |
| Smoldering Time (sec.) | | | Drips While Burning | 12 |
| Exposure to Flame (sec.) | burned completely | 15 | 15 | 15 |
| Combustion Time (sec.) | | | 39 | 0 |
| Smoldering Time | | | | |

| Exposure to flame (sec.) | Specimen Without Flame Retardant | Specimen With 10 Wt. % Commercial Bromine-Containing Flame Retardant | Specimen With 10 Wt. % $K_3[Al(C_2O_3)_3]$ |
| --- | --- | --- | --- |
| (sec.) | | Drips While Burning | 11 |

EXAMPLE 2

The polyethylene terephthalate described in Example 1 provided with self-extinguishing characteristics of $K_3[Al(C_2O_4)_3]$ was made into a tablet with the same quantity of a commercial bromine-containing flame retardant, were made as controls. The flame resistance of the specimens is characterized by the LOI (Limiting Oxygen Index).

The following results were obtained:

| | |
| --- | --- |
| Specimen without flame retardant | LOI: 20.1 |
| Specimen with commercial flame retardant | LOI: 23.6, Δ LOI = 3.5 |
| Specimen with $K_3[Al(C_2O_4)_3]$ | LOI: 27.1, Δ LOI = 7.0 |

EXAMPLE 3

$Na_3[Al(C_2O_4)_3]$ was prepared as described in Example 1 and pulverized in ethylene glycol; then polyethylene terephthalate was prepared with 10 weight % of the complex salt and molded to a test tablet of a thickness of 2 mm. The Δ LOI according to ASTM-D 2863 was 4.0.

EXAMPLE 4

The rubidium-aluminum-trioxalato complex was synthesized as follows (cf. Chem. Rev. 61 (1961), pages 213-246):

A solution of 3.46 g. (00864 mole) sodium hydroxide in 15 cc water was stirred into a warm solution of 9.65 g. (0.0144 mole) $Al_2(SO_4)_3.18H_2O$ in 43 cc water. The precipitated aluminum hydroxide was filtered off, washed and added to a boiling solution of 10.88 g. (0.0864 mole) oxalic acid in 50 cc water. A clear solution was obtained. To this solution at 100° C., a solution of 10 g. (0.0433 mole) rubidium carbonate in 13 cc water was added drop by drop and heated for an additional 30 minutes. Subsequently, the solution was filtered to remove some slight turbidity (caused by neutralization of unreacted aluminum hydroxide) and cooled. The oxalato complex was then precipitated by addition of methanol, subsequently separated by suction and dried under vacuum at 150° C. The yield was 13 g. (82.5% of the theory).

The $Rb_3[Al(C_2O_4)_3]$ obtained in the above described manner was pulverized as indicated in Example 1 in ethylene glycol and processed with 10 weight % of the complex salt to a polyethylene terephthalate. A test tablet of a thickness of 2 mm. was used to measure the Δ LOI according to ASTM-D 2863, which was 7.3.

EXAMPLE 5

Preparation of self-extinguishing copolyester fibers (polyethylene terephthalate with 7.8 weight % azelaic acid) containing 9% $K_3[Al(C_2O_4)_3]$.

a. Preparation and Pulverization of the Flame retardant.

$K_3[Al(C_2O_4)_3]$ was prepared as described in J. C. Bailar and E. M. Jones in Inorganic Syntheses 1 (1939), page 36. The resulting complex salt was subsequently dried for 15 hours at 150° C. and about 10 Torr. 200 g. of the dried complex salt was ground with 400 g. ethylene glycol, following prior dispersion for 15 min. in an Ultra-Turax mixer, for about 2 hours in a Perlmill (PMl, manufactured by Draiswerke, Mannheim) with 410 g. quartz beads of a diameter of 1 to 3 mm. After grinding, the diameter d of the largest complex salt particle in the dispersion was about 4 microns, whereas the majority of particles measured $d < 1$ μm. Subsequently, the quartz beads were separated by filtration over a screen, rinsed with 200 ml. ethylene glycol and the dispersion diluted with the rinsing solution. By allowing the dispersion to stand for 72 hours in tall vessels, particles bigger than 2 mm were largely separated (sedimentation).

b. Polycondensation 600 g. of this dilute dispersion containing 150 g. $K_3[Al(C_2O_4)_3]$ and the transesterification product of 1393 g. dimethyl terephthalate and 1200 g. ethylene glycol were introduced at a stirrer speed of 30 rpm and a temperature of 245° C. together with 107 g. azelaic acid into the polycondensation vessel. 240 ppm manganese acetate was used as transesterification catalyst, 400 ppm antimony trioxide as condensation catalyst and 300 ppm triethylphosphate as stabilizer. The polycondensation was completed after 106 min. The distilled ethylene glycol was reusable for condensation without prior purification. The polycondensate contained 9 weight % $K_3[Al(C_2O_4)_3]$.

c. Molding

The resulting polycondensate was conventionally made into chips and dried for 24 hours at 125° C. and 60 Torr. The chips were spun at 296° C. (spinning head temperature) to a filament yarn of 3.0 dtex individual filament denier and a total denier of 150 dtex 48. The filament yarns were consecutively drawn to a ratio of 1:4.2 and twisted. In terms of light stability, light fastness and solution viscosity, the textile data of the resulting material correspond largely to those of conventional polyethylene terephthalate, obtained under the above conditions without flame retardant additive.

d. Determination of the Burning Behavior

The above described filament yarn was made into a 4-filament knit and the burning behaviour was tested according to the vertical burning test (DIN 53906). A similar specimen without flame retardant and a specimen with the same quantity of commercial, bromine-containing flame retardant 2,2-bis-(4-ethoxy)-3,5-dibromophenyl propane were used as control.

The following results were obtained:

|  | Specimen Without Flame Retardant | Specimen With 10 Wt. % Commercial Bromine-Containing Flame Retardant | Specimen With 9 Wt. % $K_3[Al(C_2O_4)_3]$ |
| --- | --- | --- | --- |
| Exposure to flame (sec.) | 3 | 3 | 3 |
| Combustion Time (sec.) |  | 88 | 2 |
| Smoldering Time (sec.) |  | Drips While Burning | 12 |
| Exposure to Flame (sec.) | 15 | 15 | 15 |
| Combustion Time (sec.) |  | 39 | 1 |
| Smoldering Time (sec.) |  | Drips While Burning | 1 |

EXAMPLE 6

9 parts by weight of dry, conventionally prepared polyethylene terephthalate chips, of a solution viscosity of 1.61 were intimately mixed in a hammer mill with 1 part by weight $Li_3[Al(C_2O_4)_3]$ that was previously pulverized in a ball mill. The mixture was compressed hot to a 2 mm tablet in a known manner. The LOI of this tablet was determined according to ASTM-D 2863 and compared with the LOI of a tablet of 100% polyethylene terephthalate.

| LOI: | control | 20.1 |
| --- | --- | --- |
| LOI: | tablet according to Example 6 | 23.6 |

EXAMPLE 7

A polyethylene terephthalate molding compound was prepared from 55 weight % polyethylene terephthalate, 30 weight % fiberglass of a glass type containing calcium, 10 weight % $K_3[Al(C_2O_4)_3]$ and 5 weight % magnesium carbonate. The specimens were found to be self-extinguishing.

A control specimen of 60 weight % polyethylene terephthalate, 30 weight % fiberglass and 10 weight % $K_3[Al(C_2O_4)_3]$, while being flame resistant was, however, not self-extinguishing.

EXAMPLE 8

A 100% polyethylene terephthalate filament yarn curtain was steeped at room temperature into an aqueous bath of 100 g/l $K_3[Al(C_2O_4)_3]$, subsequently dried at 120° C. and finally subjected to 190° C. heat for 60 seconds.

The specimen was investigated according to DIN 53 906 and found to be flame resistant.

EXAMPLE 9 a. Preparation of $K_2[Zn(C_2O_4)_2]/K_4[Zn(C_2O_4)_3]$

The complex salt was prepared according to method I described by D. P. Graddon in J. Inorg. and Nucl. Chem. 1956, Vol. 3, page 321.

b. Preparation of the Glycol Suspension of the Complex Salt

The coarse grained complex salt obtained by the above-described process was successively pulverized in a ball mill and then dried for about 6 hours at about 50 Torr. and 130° C.

Subsequently, one part by weight of the finely ground complex salt was dispersed by means of a high speed stirrer in 4 parts by weight ethylene glycol and agitated for about 30 minutes. The resulting suspension was then subjected to fine grinding, for example, using a Perlmill. To prevent settling, the preliminary dispersion was vigorously stirred during grinding. As a rule, 10 minutes at intervals of 1 hour are sufficient for this.

In the case of a discontinuous operation, the suspension after completion of the grinding operation is filtered over a 360 mesh/cm² screen to separate the grinding material and any glass fragments. The glass beads can be reused for other grinding operations.

In a continuous operation, the suspension can be immediately collected and used for a further processing. Care should be taken during the entire process that the suspension remains dry (atmospheric moisture), since the salt is moderately soluble in water.

The glycolic suspension of the complex salt is stable over a period of days. It should be vigorously stirred for at least 10 minutes for use.

c. Condensation of Polyethylene Terephthalate in the Presence of the Complex Salt For the preparation of flame-proof polyethylene terephthalate on a 20 kg scale, it was necessary first to transesterify 18 kg dimethyl terephthalate with 13.5 liter ethylene glycol and 150 ppm zinc acetate as catalyst. After all methanol had been released (about 1 hour 56 minutes), 2 kg of the complex salt as a 20% glycol suspension was added to the ester interchange vessel over a period of 20 minutes. The temperature in the ester interchange vessel was 210° C. thereby. Subsequently, the excess glycol was distilled off under agitation from the ester interchange vessel over a period of 70 minutes. The total ester interchange time amounted to 3 hours 7 minutes.

200 ppm antimony trioxide, added at 250° C. to the ester interchange product, was used as condensation catalyst. The condensation was carried out at 280°–284° C. and was completed after some 95 minutes.

The autoclave was then discharged under a nitrogen stream of about 4–5 atm. in about 30 minutes.

The following polymer data was determined:

| Solution viscosity: | 1.660–1.700 |
| --- | --- |
| Melt viscosity: | 4800–6000 poise |
| Softening point: | 263–264° C. |

The polycondensate contained 10 weight % of the complex salt.

d. Molding

The resulting polycondensate was conventionally made into chips and dried for 24 hours at 150° C. and 50 Torr. The chips were spun at 296° C. (spinning head temperature) to a filament yarn of 3.0 dtex individual filament denier and a total denier of 150 dtex 48. The filament yarn was consecutively drawn to a ratio of 1:4.2 and twisted. In terms of light stability, light fastness and solution viscosity, the textile data of the resulting material correspond largely to those of conventional polyethylene terephthalate, which can be obtained under the above conditions without flame retardant additives.

e. Determination of the ΔLOI

The LOI was determined according to ASTM-D 2863 by means of a measuring instrument of Stanton Redcroft, G. B. using knitted hose weighing about 400 g/m². It amounted to 5.0

EXAMPLES 10-16

The following described oxalato complex salts were used for the preparation of flame resistant polyethylene terephthalate.

a. $K_3[Fe(C_2O_4)_3]$

Prepared according to D. P. Graddon, J. Inorg. and Nucl. Chem. 1956, Vol. 3, pp. 308-322 or Inorg. Synthesis Vol. 1, p. 36.

b. $K_3[Cr(C_2O_4)_3]$

Prepared according to D. P. Graddon, 1.C.

c. $K_2[Mg(C_2O_4)_2]$

Prepared according to D. P. Graddon, J. Inorg. and Nucl. Chem. 1956, Vol. 3, p. 321, Method I:

38 g. (0.206 mole) potassium oxalate monohydrate was dissolved in 50 cc. water, the solution was heated to the boil and reacted with a solution of 20.3 g. (0.1 mole) magnesium chloride in 100 cc. water. The system was additionally heated for 1 hour. After cooling to room temperature, the precipitate was separated by suction, chlorine was washed out with water, followed by drying in vacuum of 150° C. The yield was 20 grams (75% of the theory).

d. $K_2[Zn(C_2O_4)_2]/K_4[Zn(C_2O_4)3]$

Prepared according to D. P. Graddon, J. Inorg. and Nucl. Chem. 1956, Vol. 3, p. 321, Method I:

A solution of 57.5 g. (0.2 mole) zinc sulfate heptahydrate in 200 cc. water was stirred into a hot solution of 36.8 g. (0.2 mole) potassium oxalate monohydrate in 100 cc. water. The resulting zinc oxalate was separated by suction while hot and washed with cold water. The zinc oxalate obtained in this manner was subsequently added to the boiling solution of 75 g. (0.47 mole) potassium oxalate-monohydrate. The resulting clear solution was boiled for some 30 minutes, diluted to about 150 cc. with water and cooled. A precipitate settled out on contact with a glass rod. The latter was removed by suction, dried in vacuum first at 100° C. and then at 150° C. The yield was 54 g. (55% of the theory). The substance is composed of a mixture of $K_4[Zn(C_2O_4)_3]$ and $K_2[Zn(C_2O_4)_2]$ and has a decomposition point of 395°-430° C.

e. $K_4[Zr(C_2O_4)_4]$ 23.3 g. (0.1 mole) zirconium chloride was dissolved in 150 cc. methanol. The solution was filtered and stirred at room temperature into a solution of 20 g. (0.22 mole) anhydrous oxalic acid in 100 cc. methanol. A precipitate formed. The system was allowed to stand some 20 hours at room temperature and filtered. The precipitate was thoroughly washed with methanol, then dissolved in 100 cc. water, subsequently filtered and finally stirred into a hot solution of 40 g. (0.24 mole) potassium oxalate monohydrate in 100 cc. water. The mixture was filtered while hot and finally cooled. The resulting precipitate was separated by suction, washed with methanol and dried under vacuum at 150° C. The yield was 43 g. (75% of the theory).

f. $KBa[Al(C_2O_4)_3]$ 40.8 g. (0.1 mole) $K_3[Al(C_2O_4)_3]$ was dissolved in 200 cc. hot water. The solution was cooled to about 30° C. and stirred drop by drop into a solution of 22.4 g. (0.1 mole) barium chloride dihydrate. A precipitate formed. The system was stirred for about another hour and allowed to stand for 2 hours. Finally, the precipitate was filtered off, chlorine was washed out with water, followed by drying at 150° C. The yield was 46.6 g. (46.7% of the theory).

g. $Cs_3[Al(C_2O_4)_3]$

The complex salt was prepared analogous to the synthesis of the rubidium aluminum trioxalato complex described in Example 4. By contrast with the preceding examples, in this case, 5 or 10 weight % of the complex salt were added to the finished polyester in the extruder. The extrudate was processed to polyester films of a thickness of 2 mm. The resulting ΔLOI are listed in Table 1.

TABLE I

| Ex. No. | Complex Salt | Quantity of Compl.Salt wt. % | ΔLOI |
|---|---|---|---|
| 10 | $K_3[Fe(C_2O_4)_3]$ | 10 | 5.1 |
| 11 | $K_3[Cr(C_2O_4)_3]$ | 10 | 6.3 |
| 12 | $K_2[Mg(C_2O_4)_2]$ | 10 | 5.9 |
| 13 | $K_4[Zn(C_2O_4)_3]$ | 10 | 5.0 |
| 14 | $K_4[Zr(C_2O_4)_4]$ | 10 | 5.2 |
| 15 | $KBa[Al(C_2O_4)_3]$ | 10 | 3.0 |
| 16 | $CS_3[Al(C_2O_4)_3]$ | 5 | 6.5 |

EXAMPLES 17-34

To make a flame-resistant polyamide, nylon or Perlon chips were mixed in an extruder with 10 to 20 weight % of various oxalato complexes. The extrudate was used to make polyamide films of a thickness of 2 mm: ΔLOI are given in Table 2.

The following oxalato complexes were used:

$K_2[Mg(C_2O_4)_2]$

Prepared according to D. P. Graddon, J. Inorg. and Nucl. Chem., 1956, Vol. 3, p. 321, Method I:

38 g. (0.206 mole) potassium oxalate monohydrate was dissolved in 50 cc. water, the solution was heated to the boil and reacted with a solution of 20.3 g. (0.1 mole) magnesium chloride in 100 cc water. The system was additionally heated for 1 hour. After cooling to room temperature, the precipitate was separated by suction, chloride was washed out with water, followed by drying in vacuum of 150° C. The yield was 20 grams (72% of theoritical).

$K_2[Zn(C_2O_4)_2]/K_4[Zn(C_2O_4)_3]$

Prepared according to D. P. Graddon, J. Inorg. and Nucl. Chem., 1956, Vol. 3, p. 321, Method I:

A solution of 57.5 g. (0.2 mole) zinc sulfate heptahydrate in 200 cc. water was stirred into a hot solution of 36.8 g. (0.2 mole) potassium oxalate monohydrate in 100 cc. water. The resulting zinc oxalate was separated by suction while hot and washed with cold water. The zinx oxalate obtained in this manner was subsequently added to the boiling solution of 75 g. (0.47 mole) potassium oxalate-monohydrate. The resulting clear solution was boiled for some 30 minutes, diluted to about 150 cc. with water and cooled. A precipitate settled out on contact with a glass rod. The latter was removed by suction, dried in vacuum first at 100° C. and then at 150° C. The yield was 54 g. (55% of the theory). The substance is composed of a mixture of $K_4[Zn(C_2O_4)_3]$ and $K_2[Zn(C_2O_4)_2]$ and has a decomposition point of 396°-430° C.

$K_4[Zr(C_2O_4)_4]$ 23.3 g. (0.1 mole) zirconium chloride was dissolved in 150 cc methanol. The solution was filtered and stirred at room temperature into a solution of 20 g. (0.22 mole) anhydrous oxalic acid in 100 cc. methanol. A precipitate formed. The system was allowed to stand some 200 hours at room temperature and filtered. The precipitate was thoroughly washed with methanol, then dissolved in 100 cc. water, subsequently filtered and finally stirred into a hot solution of 40 g. (0.24 mole) potassium oxalate monohydrate in 100 cc. water. The mixture was filtered while hot and finally cooled. The resulting precipitate was separated by suction, washed with methanol and dried under vacuum at 150° C. The yield was 43 g. (72% of theoretical).

$KBa[Al(C_2O_4)_4]$ 40.8 g. (0.1 mole) $K_3[Al(C_2O_4)_3]$ was dissolved in 200 cc. hot water. The solution was cooled to about 30° C. and stirred drop by drop into a solution of 22.4 g. (0.1 mole) barium chloride dihydrate. A precipitate formed. The system was stirred for about another hour and allowed to stand for 2 hours. Finally, the precipitate was filtered off, chlorine was washed out with water, followed by drying at 150° C. The yield was 46.6 g. (46.7% of theoretical).

$K_3[Al(C_2O_4)_3]$

The complex salt was prepared as described by J. C. Bailer and E. M. Jones in Inorganic Syntheses 1 (1939), p. 36. Analysis of the different batches of product yielded values between $K_{2.87}[Al(C_2O_4)_{3.02}]$ and $K_{3.36}[Al(C_2O_4)_{3.46}]$.

$Rb_3[Al(C_2O_4)_3]$

The rubidium aluminum trioxalato complex was synthesized as follows (cf. Chem. Rev. 61 (1961), pp. 213-246).

A solution of 3.46 g. (0.0864 mole) sodium hydroxide in 15 cc. water was stirred into a warm solution of 9.65 g. (0.0144 mole) $Al_2(SO_4)_3.18H_2O$ in 43 cc water. The precipitated aluminum hydroxide was filtered off, washed and added to a boiling solution of 10.88 g. (0.0864 mole) oxalic acid in 50 cc water. A clear solution was obtained. To this solution at 100° C. a solution of 10 g. (0.0433 mole) rubidium carbonate in 13 cc. water was added drop by drop and heated for an additional 30 minutes. Subsequently, the solution was filtered to remove some slight turbidity (caused by neutralization of unreacted aluminum hydroxide) and cooled. The oxalato complex was then precipitated by addition of methanol, subsequently separated by suction and dried under vacuum at 150° C. The yield was 13 g. (82.5% of theoretical).

$K_2[Fe(C_2O_4)_2]$

Lit.

Suchay and Lenssen, Ann. 105, 255

Franke, Ann. 491, 46

Gmelin, Eisen, Part B 184 g. (1 mole) $K_2C_2O_4.H_2O$ was heated with 200 ml. water until dissolved and reacted with a suspension of 110 g. (0.61 mole) $FeC_2O_4.H_2O$ under nitrogen. The reaction mix was boiled and simultaneously reacted with additional $K_2C_2O_4.H_2O$ until the undissolved portion of $FeC_2O_4$ was dissolved. This required 40 g. $K_2C_2O_4.H_2O$, dissolved in 250 ml. water. The dark red solution was cooled under agitation whereby the complex salt gradually precipitated. The almost air-dry product was separated by suction and subsequently dried for 18 hours at 50° C. in vacuum. Yield was 170 g. (90% of theoretical).

$KBa[Fe(C_2O_4)_3]$ 37.8 g. $H_2C_2O_4.2H_2O$ (0.3 mole) was dissolved in 200 cc. water. The solution was heated to the boil and reacted portion by portion with 10.53 g. Fe-III-hydroxide (a product of Riedel de Haen, iron content 53-54%: $\triangleq 1$ mole Fe). After the ferric hydroxide was dissolved, a solution of 6.9 g. (0.05 mole) potassium carbonate in 10 cc. water was added dropwise, followed by addition of a slurry of 31.5 g. (0.1 mole) $Ba(OH)_2.8H_2O$ in 50 cc. water. A brown substance was precipitated. After boiling for two hours, the system was separated by suction while hot. A first fraction (5 g.) of the desired complex salt precipitated after cooling from the green filtrate. The brown filter residue was repeatedly boiled with water and filtered. The combined, likewise green, filtrates yielded after cooling a second fraction (23 g.) of the complex salt. The complex salt was filtered off and dried at 150° C. in vacuum. Total yield was 28 g. (56.5% of theoretical).

Table 2

| Example No. | Polymer | Complex Salt | Quantity of Complex Salt Wt. % | Δ LOI |
|---|---|---|---|---|
| 17 | Nylon | $K_2[Mg(C_2O_4)_2]$ | 10 | 2.5 |
| 18 | PERLON | " | 10 | 2.6 |
| 19 | Nylon | $K_2[Zn(C_2O_4)_2]$ $K_4[Zn(C_2O_4)_3]$ | 10 | 1.0 |
| 20 | PERLON | " | 10 | 1.0 |
| 21 | Nylon | $K_4[Zr(C_2O_4)_4]$ | 20 | 2.6 |
| 22 | PERLON | " | 20 | 0.9 |
| 23 | Nylon | $KBa[Al(C_2O_4)_3]$ | 10 | 0.6 |
| 24 | Nylon | " | 20 | 1.6 |
| 25 | PERLON | " | 10 | 0.9 |
| 26 | PERLON | " | 20 | 2.0 |
| 27 | Nylon | $K_3[Al(C_2O_4)_3]$ | 10 | 1.1 |
| 28 | PERLON | " | 10 | 1.6 |
| 29 | Nylon | $Rb_3[Al(C_2O_4)_3]$ | 10 | 2.6 |
| 30 | PERLON | " | 10 | 1.6 |
| 31 | Nylon | $K_2[Fe(C_2O_4)_2]$ | 10 | 3.9 |
| 32 | PERLON | " | 10 | 3.4 |
| 33 | Nylon | $KBa[Fe(C_2O_4)_3]$ | 10 | 4.4 |
| 34 | PERLON | " | 10 | 4.1 |

EXAMPLES 35-39

To obtain flame resistant plastics, 10 weight % $K_3[Al(C_2O_4)_3]$ was incorporated in a conventional manner in various polymers. In most cases, both the polymer and the flame retardant were finely ground, sifted and the powders then mixed together, dried for several hours at 150° C. in vacuum, and the mix was finally compressed in the presence of heat to test sheets measuring 3×6.5×150 mm. For polycarbonates, the flame retardant was dispersed in a solution of the polymer in dichloromethane, followed by removal of the solvent under vigorous stirring and at gradually increasing temperature. The resulting foam-like material was dried for one hour at 105° C. in vacuum, then also ground and turned into test sheets.

The LOI of these sheets was determined according to ASTM-D 2863 and compared with the LOI of a sheet of the same material without flame retardant. The tested polymer materials and ΔLOI are compiled in Table 3.

TABLE 3

| Example No. | Polymer | Δ LOI |
|---|---|---|
| 35 | Polypropylene (Vestolen P 6200, Huels) | 1.6 |
| 36 | Polyacrylonitrile butadiene styrene (Terluran, BASF) | 2.5 |
| 37 | High impact strength polystyrene (BASF) | 1.0 |

TABLE 3-continued

| Example No. | Polymer | Δ LOI |
|---|---|---|
| 38 | Epoxy resin (Araldit, Ciba-Geigy) | 1.3 |
| 39 | Polymethyl-methacrylate (Plexiglass) | 1.9 |

What is claimed is:

1. A flame resistant polyester, polyamide, polyolefin, polyacrylate or epoxy resin molding compound having incorporated therein a flame retardant amount of an additive having the following general formula:

$$Me_k^I Me_m^{II}[Z(C_2O_4)_n]$$

wherein $Me^I$ represents Li, Na, K, Rb, Cs, or $NH_4$, $Me^{II}$ represents one of the aforementioned cations or Ba; Z represents one of the central atoms Mg, Ba, Zr, Fe, Co, Cu, Zn, Al, Sn, Cr, and Sb and $K \approx 0, 1, 2, 3,$ or $4$, $m \approx 0$ or $1$ and $n \approx 2, 3,$ or $4$, provided that k and m are not, simultaneously, zero.

2. A molding compound according to claim 1 containing oxalato complex in amounts of 1 to 40 weight %.

3. A molding compound according to claim 1, containing oxalato complex in amounts of 5 to 15 weight %.

4. A flame-resistant polyester molding compound containing a flameproofing amount of one or more oxalato complexes as the sole flame-retardant additive.

5. A flame-resistant polyester molding compound having incorporated therein a flame-retardant amount of an additive having the following general formula:

$$Me_k^I Me_m^{II}[Z(C_2O_4)_n]$$

wherein $Me^I$ represents Li, Na, K, Rb, Cs or $NH_4$, $Me^{II}$ represents one of the aforementioned cations or Ba; Z represents one of the central atoms Mg, Ba, Zr, Fe, Co, Cu, Zn, Al, Sn, Cr and Sb and $k \approx 0, 1, 2, 3,$ or $4$, $m \approx 0$ or $1$ and $n \approx 2, 3,$ or $4$, provided that k and m are not, simultaneously, zero.

6. The molding compound of claim 5 wherein the molding compound is a polyester selected from the group consisting of polyethylene terephthalate, polypropylene terephthalate and polybutylene terephthalate.

7. Process for the preparation of permanently flame-retardant molding compounds of a polyester selected from the group consisting of polyethylene terephthalate, polypropylene terephthalate, and polybutylene terephthalate, comprising incorporating a flameproofing amount of one or more oxalato complexes as the flame-retardant additive in the molding compound having the general formula:

$$Me_k^I Me_m^{II}[Z(C_2O_4)_n]$$

wherein $Me^I$ represents Li, Na, K, Rb, Cs or $NH_4$, $Me^{II}$ represents one of the aforementioned cations of Ba; Z represents one of the central atoms Mg, Ba, Zr, Fe, Co, Cu, Zn, Al, Sn, Cr and Sb and $k \approx 0, 1, 2, 3,$ or $4$, $m \approx 0$ or $1$ and $n \approx 2, 3,$ or $4$, provided that k and m are not, simultaneously, zero.

8. Process for the preparation of permanently flame-retardant molding compounds of polyester, polyamides, polyolefins, polyacrylates, and epoxy resins, comprising incorporating a flameproofing amount of one or more oxalato complexes as the sole flame-retardant additive in the molding compound wherein the oxalato complex contains a complex anion of the type $[Z(C_2O_4)_n]^{-e}$, whereby Z represents one or more central atoms selected from the group consisting of Mg, Ca, Sr, Ba, Zr, Hf, Ce, V, Cr, Mn, Fe, Co, Ni, Cu, Zn, Cd, B, Al, Ga, In, Sn, Pb and Sb, n represents the number of ligands and $-e$ is the negative charge of the complex anion.

9. Process according to claim 8 wherein the oxalato complex contains a cationic constituent which contains at least one of the ions Li, Na, K, Rb, Cs, or $NH_4$ or one of the mentioned ions and Ba.

10. Process for the preparation of permanently flame-retardant molding compounds of polyester, polyamides, polyolefins, polyacrylates, and epoxy resins, comprising incorporating a flameproofing amount of one or more oxalato complexes as the sole flame-retardant additive in the molding compound wherein the oxalato complex presents the general formula:

$$Me_k^I Me_m^{II}[Z(C_2O_4)_n]$$

wherein $Me^I$ represents Li, Na, K, Rb, Cs, or $NH_4$, $Me^{II}$ represents one of the aforementioned cations or Ba; Z represents one of the central atoms Mg, Ba, Zr, Fe, Co, Cu, Zn, Al, Sn, Cr and Sb and $k \approx 0, 1, 2, 3,$ or $4$, $m \approx 0$ or $1$ and $n \approx 2, 3,$ or $4$, provided that k and m are not simultaneously, zero.

11. Process according to claim 10 wherein the molding compound is a polyamide.

12. The process of claim 8 wherein the oxalato complex is a salt of an alkali aluminum-oxalic acid of the formula $Me_3Al(C_2O_4)_3$ or $Me Al(C_2O_4)_2$, wherein Me represents Li, Na, K or Rb.

13. The process of claim 12 wherein the oxalato complex salt is $K_3Al(C_2O_4)_3$.

14. The process of claim 13 wherein the molding compound is a homopolyester or a copolyester of terephthalic acid.

15. The process of claim 12 wherein the oxalato complex salt is selected from the group consisting of $Na_3Al(C_2O_4)_3$, $K_3Al(C_2O_4)_3$, $NaAl(C_2O_4)_2$, $KAl(C_2O_4)_2$, $Rb_3Al(C_2O_4)_3$ and $RbAl(C_2O_4)_2$ or a mixtue thereof added to the monomers from which the molding compound is prepared.

16. The process of claim 15 wherein the molding compound is a polyester.

* * * * *

UNITED STATES PATENT OFFICE
CERTIFICATE OF CORRECTION

Patent No. 4,169,827　　　　　　　　　Dated October 2, 1979

Inventor(s) Klaus Gerlach and Wolfgang Lange

It is certified that error appears in the above-identified patent and that said Letters Patent are hereby corrected as shown below:

In Claim 12 at column 20, line 41 change "8" to read --10--.

Signed and Sealed this

Twenty-sixth Day of February 1980

[SEAL]

Attest:

SIDNEY A. DIAMOND

Attesting Officer　　　Commissioner of Patents and Trademarks